US005700536A

United States Patent [19]
Steidinger

[11] Patent Number: 5,700,536
[45] Date of Patent: Dec. 23, 1997

[54] INTEGRATED LABEL, METHOD AND APPARATUS

[75] Inventor: Donald J. Steidinger, Barrington, Ill.

[73] Assignee: Tamarack Products, Inc., Wauconda, Ill.

[21] Appl. No.: 597,852

[22] Filed: Feb. 7, 1996

[51] Int. Cl.$^6$ ............................................. B32B 3/00
[52] U.S. Cl. ................ 428/40.1; 283/81; 428/41.7; 428/41.8; 428/41.9; 428/42.1; 428/42.2; 428/43; 428/194; 428/212; 428/213; 428/214
[58] Field of Search ................ 428/40.1, 41.7, 428/41.8, 41.9, 42.1, 42.2, 43, 194, 212, 213, 214; 283/81

[56] References Cited

U.S. PATENT DOCUMENTS

| | | |
|---|---|---|
| 4,379,573 | 4/1983 | Lomeli et al. .......................... 428/42 |
| 4,889,234 | 12/1989 | Sorensen ................................ 428/41.9 |
| 5,011,559 | 4/1991 | Felix ..................................... 156/257 |
| 5,098,759 | 3/1992 | Felix ..................................... 428/42 |
| 5,271,787 | 12/1993 | Hoffman et al. ...................... 156/268 |
| 5,580,640 | 12/1996 | Kraft .................................... 428/195 |

*Primary Examiner*—Nasser Ahmad
*Attorney, Agent, or Firm*—Emrich & Dithmar

[57] ABSTRACT

An integrated label product, method and apparatus wherein there is a first ply equipped with a die cut delineating a removable label, a backer ply having a release material on one surface and adhesive between the backer ply one surface and the label-providing ply, the adhesive being provided in primary pattern and a secondary pattern in different positions with the secondary pattern having substantially less adhesion than the primary pattern.

21 Claims, 4 Drawing Sheets

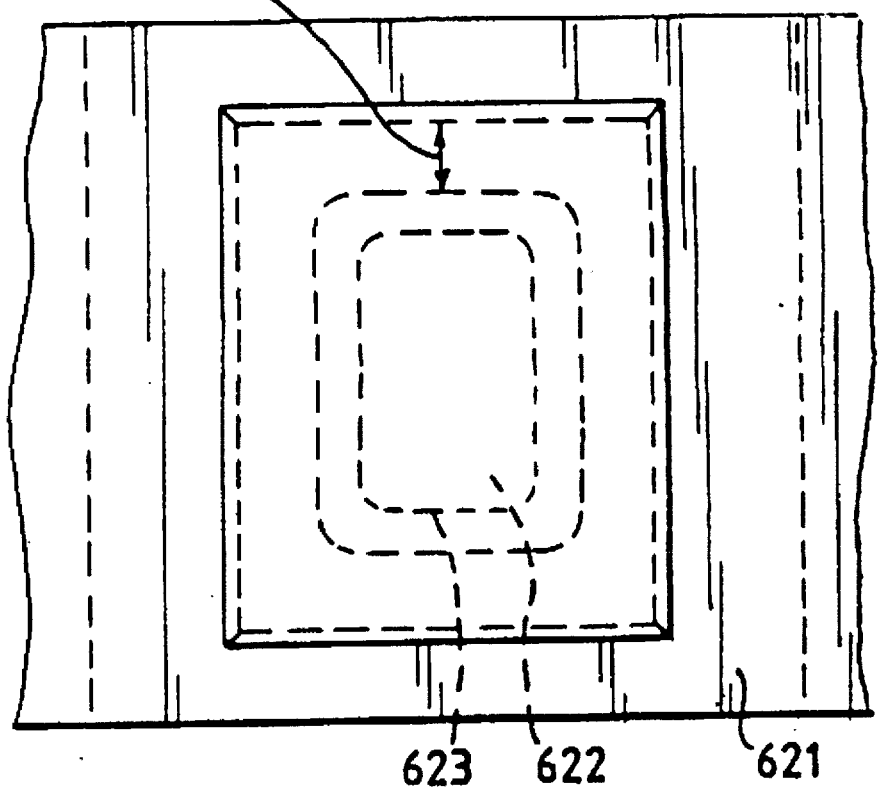

INTEGRATED LABEL, METHOD AND APPARATUS

BACKGROUND AND SUMMARY OF INVENTION

This invention relates to an improved integrated label product, method and apparatus for making the label product and more particularly to improve known integrated label products by reducing the possibility of oozing adhesive along the edges of the backing material and to prevent loose edges of the backing material from folding over, wrinkling or otherwise causing feeding jam-ups in manufacture or use.

The integrated label of U.S. Pat. No. 4,379,573 uses a transfer tape such as supplied by Ludlow Technical Products of Chicoppe, Mass. which includes a release coated backer with a continuous pressure sensitive adhesive coating, typically centered in the web leaving a narrow margin along both longitudinal edges of the backer without adhesive. When a length of this tape is cut from the web to provide an individual piece, the transverse cut edges have pressure sensitive adhesive (hereinafter PS adhesive) extending to the very edge.

A newer transfer material called Free Film Lite manufactured by Precision Coated Products of Batavia, Ill. has PS adhesive coating extending to the longitudinal edges of the tape. The PS adhesive may ooze from under these edges and at the transverse cut edges in time or due to high temperatures and pressures sometimes encountered in laser printers. This results in exposed adhesive that can cause forms to stick together either in a stack of cut sheets or a pack of folded forms and also deposit on the drums of the laser printer.

The integrated label of U.S. Pat. Nos. 5,011,559 and 5,098,759 addresses this problem by providing a pattern of PS adhesive that stops short of all the edges of the cut piece of release coated backer used to cover the adhesive. This product does solve the problem of oozing PS adhesive becoming exposed beyond the edge of the covering backer piece. However, it creates a new problem that users of this product frequently report. This is of the loose unglued margins folding over or getting caught in the process of feeding the forms both during manufacture and also in subsequent use, particularly in the now popular laser printers. The label of U.S. Pat. No. 5,271,787 attempts to solve the adhesive oozing problem by providing a pattern of release coating that does not extend to edges of the cut backer. It says that the PS adhesive can adhere to the edges that are without release coating more strongly than if the adhesive were deposited on a release coated surface and this bonding serves as a barrier to seepage of adhesive.

It is an object of my invention to improve upon the products described by avoiding the potential exposed adhesive edges as in U.S. Pat. Nos. 4,379,573 and 5,271,787; the loose edges of U.S. Pat. Nos. 5,011,559 and 5,098,759; and to provide the method and apparatus to make the improved product.

BRIEF DESCRIPTION OF DRAWINGS

The invention is described in conjunction with the accompanying drawing, in which

FIG. 9 is a view similar to FIG. 3 but of a sixth embodiment of the invention;

DETAILED DESCRIPTION

Figure 1:
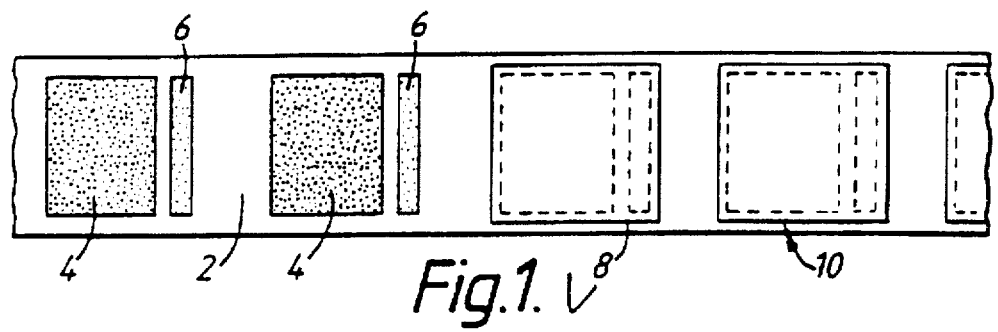
FIG. 1 is a fragmentary top plan view (somewhat schematic) of an integrated label product according to the prior art such as represented by U.S. Pat. Nos. 5,011,559 and 5,098,759.
Figure 2:
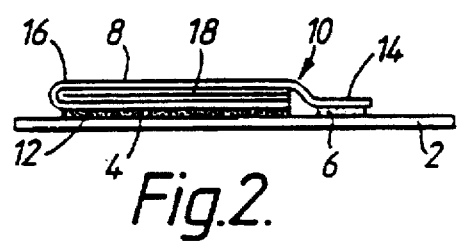
FIG. 2 is another representation of the prior art being a sectional view taken along the site line 2—2 as applied to FIG. 1.

FIG. 1 shows a prior art integrated label form 21 including a label 22 delineated by a perforated die cut 23 through the thickness of form. The label 22 is covered by a primary pattern of PS adhesive 24 that extends beyond the limits of the die cut label 22 sufficiently to hold release coated backer piece 25 to the body of form 21 after the label 22 is removed form the form 21. The release coated backer piece 25 is used to cover the pattern of adhesive and includes a margin 26 extending beyond the edges of the primary adhesive pattern 24 to protect against oozing of the adhesive 24 beyond the edges of the backer 25. FIG. 2 shows a cross section of the assembly described in FIG. 1 where the form 21 includes a label area 22 delineated by die cut 23 with adhesive pattern 24 extending beyond the label area 22 and positioned between form 21 and the release coated surface of backer piece 25. The backer 25 extends beyond the adhesive pattern 24 top provide margins 26 on all four sides.

First Embodiment

Figure 3:
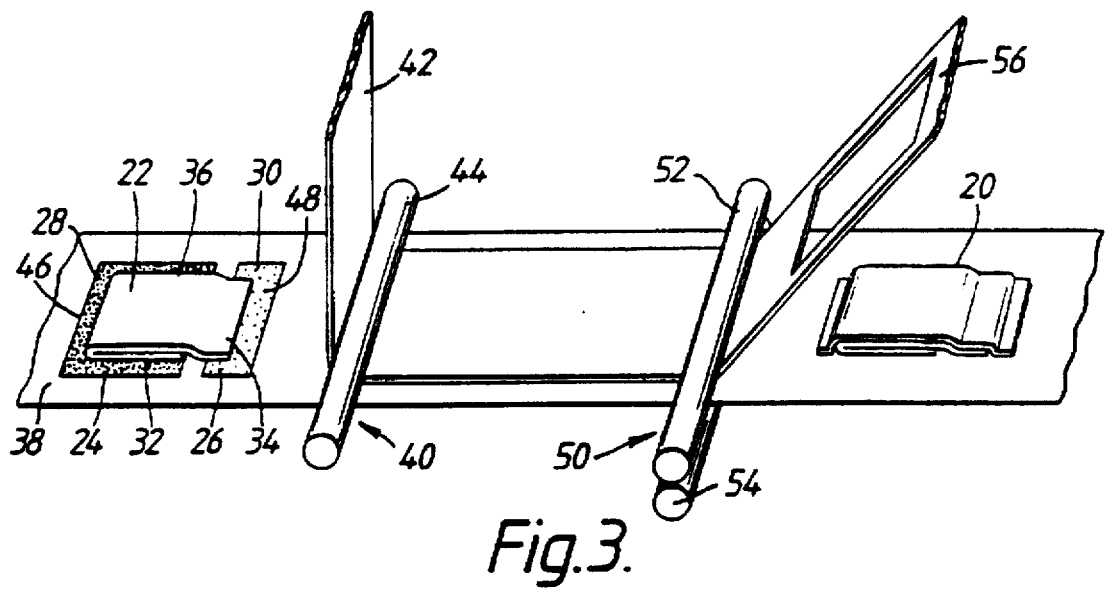
FIG. 3 is a view similar to FIG. 1, being a top plan view of a first embodiment of an integrated label product made according to the invention.

In common with the prior art, FIG. 3 shows a form (here designated 121). For this and other embodiments the initial numeral of an element is changed by 100 but the remaining two digits are the same when reference is made to such an element.

Here, the label is designated 122, the die-cut 123, the primary adhesive 124, the release coated backer piece 125, and the margins 126.

Added are narrow lines designated 127 of a secondary adhesive in the margin area 126 along edges 125a that are the continuous edges of the web of material from which piece 125 is cut. Additional narrow lines of secondary adhesive 128 are added in the areas of margin 126 near the cut edges 125b developed when piece 125 is cut from a web as described hereinafter in conjunction with FIG. 11. The narrow lines of secondary adhesive 127, 128 stop short of the cut edges 125b of release backer piece 125 so the narrow lines of a secondary adhesive 127, 128 are spaced a short distance away from the edges 125a, 125b of backer piece 125. The lines 127, 128 are narrow, covering only a small portion of the area of margins 126 and can be made of a lesser thickness than is needed in the primary adhesive area 124. These secondary adhesive lines 127, 128 are used only to hold down the marginal edges to prevent them from folding over, lifting, etc., which could cause jam ups. This makes is practical to place the adhesive lines 127, 128 closer to the edges 125a, 125b of backer piece 125 without the problem of oozing than is possible if the primary pattern area of adhesive 124 were positioned equally close to the edges of backer piece 125. As indicated above, the adhesive lines 127, 128 need have only sufficient holding force to prevent the margins 126 from folding over or raising up away from the surface of form 121 during feeding and handling, thereby preventing jam-ups in feeding during manufacture or ultimate use in a computer printer or the like. The aggressive holding force most commonly required by label 122 and provided by the primary pattern of adhesive 124 is much greater than that required by the secondary pattern of adhesive of the narrow lines 127, 128 used to hold the margins 126 in place during feeding and handling. The primary adhesive 124 is a pressure sensitive adhesive providing the adhesion for the label 122 when removed from form 121 and applied to a surface to be labeled. This adhesion requirement varies from (a) modest if the label is to be removed without damage to the surface or to the label to (b) substantial if the label is to be used as a shipping label on a corrugated carton, for example. The primary PS adhesive can be a hot melt, water emulsion or solvent based, all well known in the art.

The secondary adhesive as used at 127, 128 can be the same as the primary adhesive used at 124 but typically of a thinner coating thickness or, more advantageously, it can be an adhesive that forms a permanent bond upon curing after which it does not have a pressure sensitive characteristic and thereby does not pose a risk of adhering to other forms in a pack or to the drums in a laser printer even if it is exposed. Curing can be by drying or exposure to UV light, for example.

Second Embodiment

To avoid repetition, only new elements will be described—for the most part—in this and the other ensuing examples.

Figure 4:
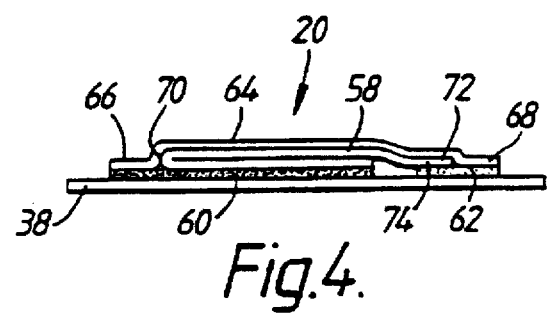
FIG. 4 is a view similar to FIG. 3 but of a second embodiment of the invention.

FIG. 4 shows a modification of the embodiment of FIG. 3 in that the secondary lines of adhesive 229, 230 do not stop short of the edges of backer piece 225. This simplifies manufacture, set-up time and the cost of the equipment to provide the lines 219, 230 and can be used when the amount of glue and its aggressive and oozing characteristics as well as the requirements in feeding and handling of the form 1 during manufacture and ultimate printing of the form 221 can tolerate the possibility of minute amounts of exposed adhesive or if the secondary adhesive does not pose an exposure problem after curing.

Third Embodiment

Figure 5:
FIG. 5 is a view similar to FIGS. 3 and 4 but of a third embodiment of the invention.

FIG. 5 shows another embodiment of the invention. The primary body of adhesive 324 is divided into several separated areas of adhesive. Two such areas are shown in the view for illustration. Narrow lines of secondary adhesive 331 are used to provide securing of the marginal areas 326. These narrow lines can extend to the cut edges of backer piece 325 as in FIG. 4 or they can be stopped short of the edges as in FIG. 3. This pattern of divided main body of adhesive 324 and narrow lines 331 can be advantageous when the area of adhesive 324 and label 322 are relatively large in order to reduce the tendency to wrinkle the form 321. It also simplifies the pattern of narrow glue lines—permitting shorter set-up time, and the use of less costly equipment. The pattern 324 can be advantageously positioned to leave the edges 322a of the label without adhesive 324 in order to make it easier to start the peeling of label 322 at the time of removal from form 321.

Fourth Embodiment

Figure 6:
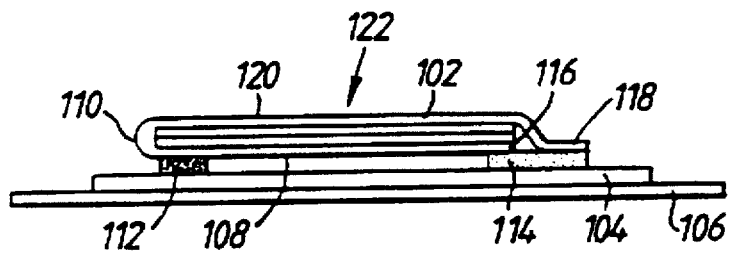
FIG. 6 is a view similar to FIGS. 3–5 but of a fourth embodiment of the invention.

FIG. 6 shows still another embodiment of the invention utilizing dots of secondary adhesive 432, or the like which have small volumes of glue that can be located nearer the edges of the backer piece 425 without likelihood of oozing and yet strong enough to hold the margins 426 in place while the form 421 is being fed or otherwise handled during manufacture and use.

Fifth Embodiment

Figure 7:
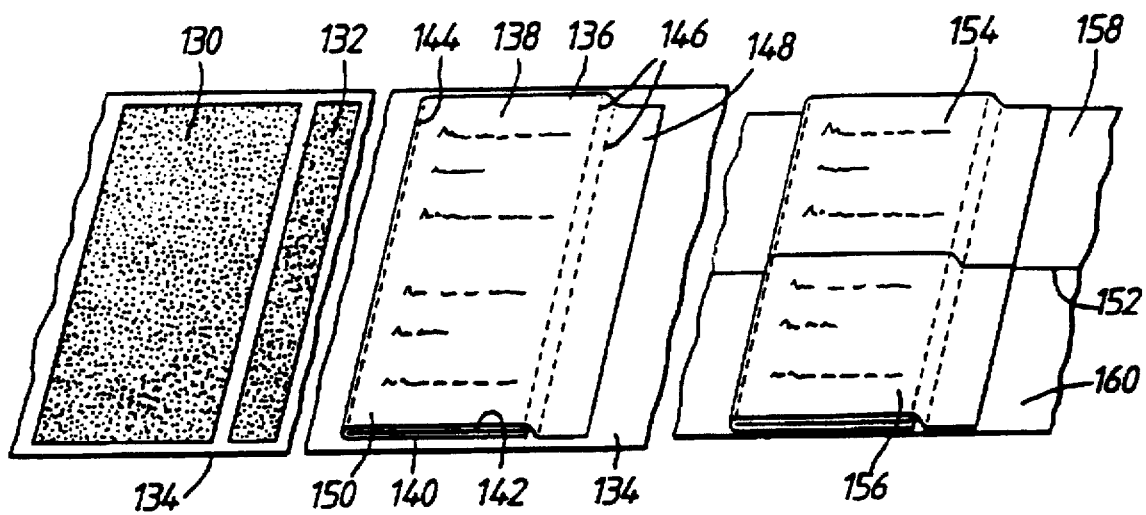
FIG. 7 is a view similar to FIG. 3 but of a fifth embodiment of the invention.
Figure 8:
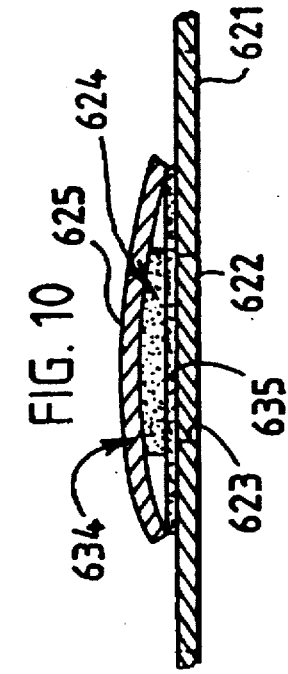
FIG. 8 is a sectional view taken along the sight line 8—8 of FIG. 7.

FIGS. 7 and 8 show a further embodiment of the invention in which the adhesive generally designated 524 is tapered in thickness as at 533 in the margin areas 526 as seen in FIG. 8. In FIG. 7, this is indicated by the double ended arrow. Thus, the untapered or central portion 534 of the adhesive can be considered the primary body, corresponding to the adhesive areas 24, 124, 224, etc. described previously. As also previously explained, the margin areas 26, 126, 226, etc. are those between the main body of primary adhesive 24, 124, 224, etc. and the edges of the backer piece 25, 125, 225, etc.. Here, the primary adhesive does not have a definite edge or end due to the tapering. However, the area designated 524 is full thickness of the primary adhesive—as contrasted to the tapered portion 533—see especially the sectional view of FIG. 8. The tapered portion 533 extends into the margin areas 526 all the way to the backer edges as at 525a, 525b or it can stop short of the edges of the backer 525. In this way, the adhesive 524 becomes very thin at or just short of the edges of backer piece 525. This serves to hold the marginal areas 526 in position during handling using the minimum amount and thickness of the adhesive 524 near the edges. In this way, objectionable oozing of the adhesive is kept to an acceptable level to meet the requirements of the specific application in which the form 521 is to be used. As before, the label is defined by a die cut—as at 522 and 523, respectively.

Sixth Embodiment

Figure 10:
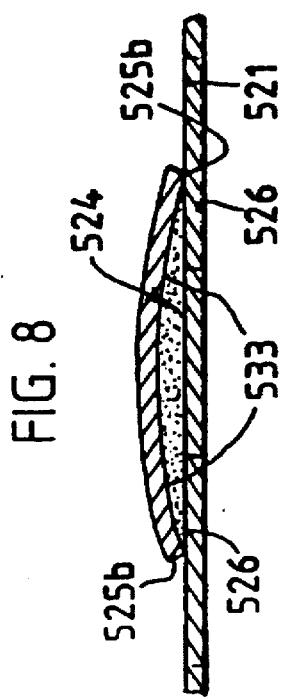
FIG. 10 is a sectional view of generally of the type of form seen in FIGS. 9.

FIGS. 9 and 10 show a sixth embodiment of the invention—the label 622 being defined by the die cut 623. As illustrated most clearly in FIG. 10 there is a stepped pattern of adhesive generally designated 634 that extends into the marginal areas 626—so designated by the double ended arrow in FIG. 9. The primary adhesive area 624 is of greater thickness than the adhesive in the marginal areas 626. The primary adhesive 624 provides sufficient adhesive to adhere to the label 622 to the surface to be labeled—as well as providing adhesive to secure the backer piece 625 to the form 621.

In the marginal areas 626 a thinner coating or film of the same or compatible adhesive is employed to complete the stepped pattern of adhesive 634 as shown in FIG. 10. The thinner coating or film of adhesive 635 may have edges that stop short of the edges of the backer piece 625 as shown in FIG. 9 or can extend to the edges thereof—as in FIG. 10. The stepped pattern of adhesive 634 can be applied using a first applicator for the secondary adhesive 635 and a second applicator for the primary adhesive 624. The stepped pattern of adhesive 635 can alternatively be applied using one applicator, such as an extruding nozzle. For example, by using a lesser flow of adhesive to provide the thinner secondary coating of adhesive 635 and an increased flow to provide the primary adhesive 624. The change in flow rates is readily accomplished using computer control of the flow as is well known in the art.

Apparatus

Figure 11:
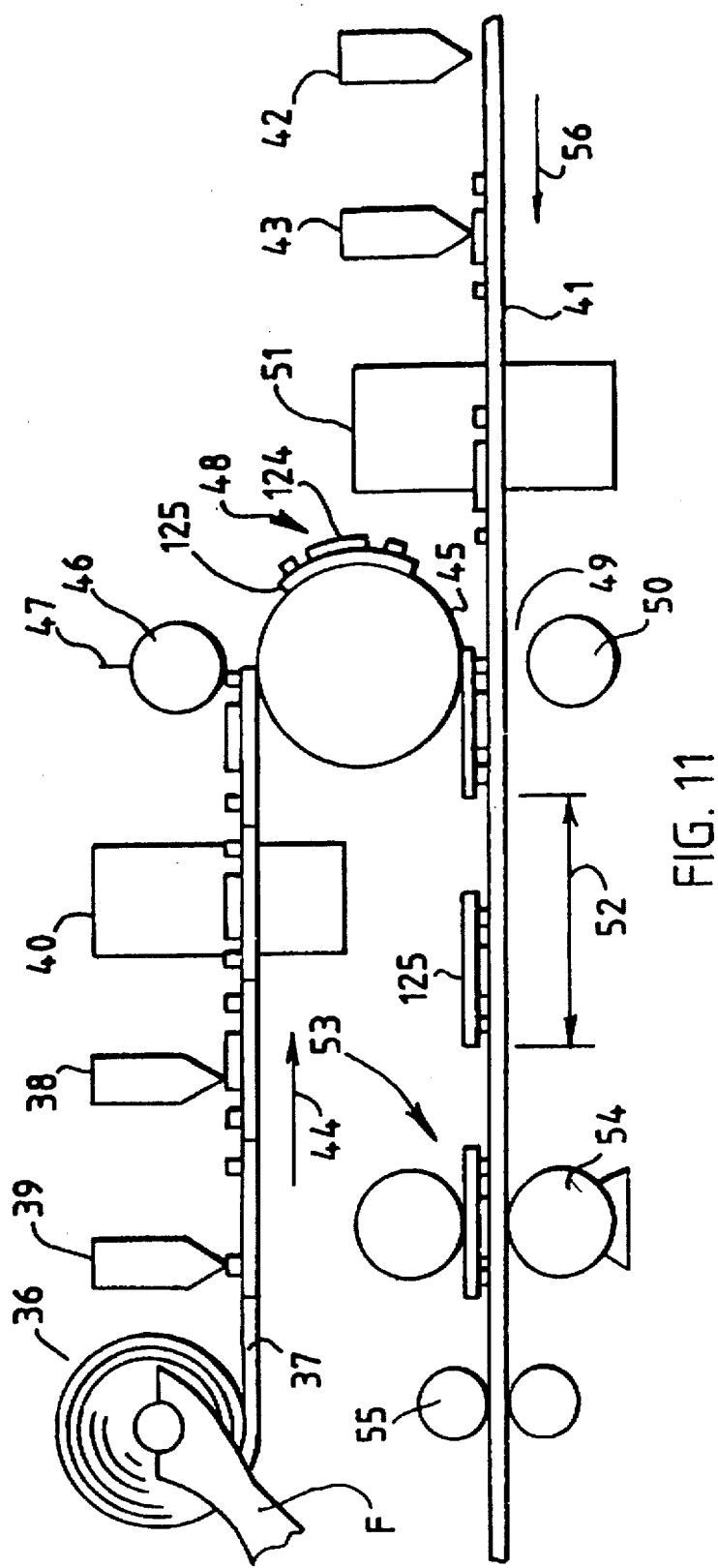
FIG. 11 is a side elevational view (somewhat schematic) of apparatus useful in the practice of the invention and which also illustrates the inventive method.

The apparatus of FIG. 11 can be used to manufacture the inventive label product. A roll 36 of release coated backer material unwinds to provide a web 37 of the material. A glue applying station 38 is used to provide a primary pattern of adhesive 124 (as shown in FIG. 3 for example) on the upper side of web 37 as shown in FIG. 11. A single adhesive station 38 can also apply the adhesive patterns 127, 128 of FIG. 3 and/or the patterns 229, 230 of FIG. 4, the tapered adhesive pattern 533 of FIG. 8 and 634 of FIG. 10. The adhesive station 38 is typically a hot melt extruding unit used to apply hot melt pressure sensitive adhesive but it can also be a flexo graphic, gravure or screen printing unit. Flexo graphic, gravure and screen printing units as well as extruding nozzle applicators for both hot melt and cold adhesives are well known in the art.

A second adhesive applying station 39 is used to provide the secondary adhesive pattern 331 of FIG. 5 and 432 of FIG. 6. The patterns of adhesive in FIG. 5 can be conveniently made using adhesive station 39 for the secondary adhesive lines 331 and adhesive station 38 for the primary adhesive patterns 324. Likewise, the patterns of adhesive in FIG. 6 can be made using secondary adhesive station 39 for the adhesive dots 432 and station 38 for the primary pattern 424. Generally, it is advantageous to apply the lighter pattern of adhesive first. The pattern of adhesive in FIG. 10 can also be made using two Adhesive stations. In this case, the thinner pattern 635 is best applied first at station 39 and the main body of adhesive 624 is applied over the thinner pattern 635 at station 38.

The web 37 with the adhesive patterns now applied carries the patterns to a station 40 to cure the patterns of adhesive if cold adhesives are used. In the case of hot melt adhesives, curing is not required but it is sometimes desirable to cool the patterns of adhesive in which case station 40 can be used for this purpose. Curing can be by drying, heating, cooling, and by UV or infra red radiation, for example.

The right hand portion of FIG. 11 shows provision for an alternative method of applying the glue patterns. In this case the glue patterns are applied to the carrier 41 which ultimately becomes the form 121, 221, 321, etc. rather than the web 37. Alternative glue applicator 42 is used to apply the secondary patterns of applicator 39 and glue applicator 43 is used to apply the primary patterns of glue of applicator 38 as described previously. It is apparent that some patterns of glue can be applied to web 37 and others on the carrier 41 producing combined patterns between the surface of carrier 41 and the release coated surface of backer 125 being the same as if the patterns were applied to only one of the surfaces. The web 37 moves in the direction of arrow 44 to the applicator cylinder 45 where the web 37 is cut to length by means of cut-off roll 46 that is equipped with cutting knives 47 to produce backer piece 125. The cut assembly generally designated 48 consisting of the cut portion of the release coated backer piece 125 with a primary and secondary adhesive patterns of FIGS. 3, 4, 5, 6, 7, 9 in contact with the release coated side of backer 125 is transported by applicator cylinder 45 and transferred to the web 41 at a point 49. Web 41 is eventually cross perforated and folded into a pack of forms, it can be cut-off to provide the form as individual sheets or it can be rewound into a roll. An impression cylinder 50 is typically used to aid in the transfer of the assembly 48 and to insure that it is laid down smoothly and adhered to the web 41. If the glue patterns are applied to web 41 by the alternate glue applicators 42, 43 using alternate curing station 51 if required, the release coated backer web 37 with no glue or only one of the glue patterns is cut into pieces 125 and applied by applicator cylinder 45 in a similar manner as described when both glue patterns are carried by web 37. The web 41 carries the series of forms with the assembly 48 attached at desired intervals 52 to a die cut unit 53 with die 54 that is used to provide the die cut 123 of FIG. 3 through the thickness of form 121 but not through the backer piece 125. The form is completed as a cut sheet, zig-zag folded pack or rewound into a roll by means and apparatus well known in the art.

Summary

The invention in the aspect providing an integrated label assembly includes a first ply as at 121, for example in FIG. 3 and similar numerals in the other embodiments, viz., 221, 321, 421, etc. This ply has front and back surfaces—as for example in FIG. 8 the first ply 521 has a front surface 521a and a back surface 521b. Still referring to FIG. 8, the numeral 523 designates a die cut in the ply 521 which delineates a removal label portion 522.

Now referring to FIG. 3 as an example, I provide a primary adhesive pattern on the back surface of the first ply as at 124 and this is carried through the other embodiments as at 224, 324, etc. This primary adhesive pattern substantially covers the label portion as can be appreciated from a consideration of FIG. 3 and extends beyond the label portion to define an adhesive pattern perimeter which can be seen in FIG. 3 with the designation 124'.

Also provided according to the invention is a release coated backer ply 125 (still referring to FIG. 3) which has a perimeter generally designated 125'. This ply covers the label portion 122 and the primary adhesive portion 124. There is also a portion of the backer ply extending beyond the primary adhesive pattern perimeter 124' to provide a margin 126 between the adhesive pattern perimeter 124' and the backer ply perimeter 125'.

There is a secondary adhesive pattern illustrated in FIG. 3 as narrow lines 127 and 128 in the margin 126 which serve to adhere the backer ply to the back surface of the first ply. And, as pointed out previously in the foregoing specification, the secondary adhesive pattern has a substantially less adhesion characteristic than the primary adhesive pattern.

Not only does the secondary adhesive pattern include narrow lines as at 127 and 128 in FIG. 3 and 229 and 230 in FIG. 4 and 331 in FIG. 5 but dots as at 432 in FIG. 6. It can be appreciated from the consideration of the foregoing just mentioned views FIGS. 3–6 that the secondary adhesive pattern covers a relatively small area of the margin which exists between the perimeter 124' of the primary adhesive pattern and the perimeter 125' of the backer ply 125.

The secondary adhesive pattern is also illustrated as being thinner in thickness than the primary adhesive pattern which can be appreciated from a consideration of FIG. 10 where the primary pattern is designated 624 and the thinner or secondary pattern is designated 635. Still further, the secondary adhesive pattern can taper in thickness as can be appreciated from the portions designated 533 and 524 in FIG. 8 with the thinner edge being positioned adjacent the perimeter of the release coated backer as can be appreciated from the edges 525b in FIG. 8 and the edges 525a and 525b in FIG. 7.

A suitable variety of adhesives may be employed to advantage in the practice of the invention and in one exemplary case the secondary adhesive pattern can be a pressure sensitive (PS) adhesive. This secondary adhesive pattern can be a hot melt adhesive or one of a water emulsion or a solvent based adhesive.

The secondary adhesive pattern may stop short of the perimeter of the backer ply where the lines 127 and 128 do not extend to the perimeter 125' of the backer ply. On the other hand, the lines 229 and 230 in FIG. 4 do extend to the perimeter 225' of the backer ply 225 in FIG. 4.

Another advantageous aspect of the invention has to do with the use of the form in processing—whether in manufacture or in printing. For example, in FIG. 3, the form or first ply 121 may be moved to the left during manufacture or in computer printing as by having the edge 121a being in advance or leading during the advance of the form 121. This leading edge has adjacent thereto a portion of the backer ply perimeter 125" with the secondary adhesive pattern as at 128 and a portion of 127 being in the margin adjacent this backer ply perimeter portion 125". This ensures that there is reduced likelihood of fold-over or rising up and catching of the backer ply during the advancement in processing.

A variety of advantageous features are possible according to the invention. For example, the first ply or form 121, 221, etc. may be constructed of paper. Further, the die cut as at 123, 223, etc. may be a continuous cut or it may be a perforation, i.e., an interrupted continuous cut. Further, the primary adhesive can be pressure sensitive of a hot melt, a water emulsion or a solvent base type of adhesive. Still further, the primary pattern of adhesive may be equipped with an unglued portion of the label to provide the start of peeling at the time the label is removed—as previously described relative to the edge 322a of FIG. 5.

In further summary, the method of the invention for making an integral label assembly includes steps of providing a first ply as at 121 suitable for label usage and a backer ply as at 125 having a surface equipped with a release material—such as a silicone.

The method further includes the step of applying a primary adhesive pattern as at 124 (see FIG. 3 again) and which has a perimeter as at 124'. I select a secondary adhesive pattern having substantially less adhesion than the primary adhesive pattern and apply this secondary adhesive pattern to one of the plies wherein the secondary adhesive pattern has at least a portion outside of the primary adhesive pattern perimeter, i.e., in the portion between the perimeters 124' and 125'. The method further includes the step of uniting the plies with the backer ply material with the release coated surface being in confronting relation to the first ply and with adhesive between the plies. Thereafter, I provide the step of die cutting the first ply as at 123 which is within the primary adhesive pattern and this provides a label 122.

The method of the invention can also be appreciated from a consideration of FIG. 11 wherein the steps of applying patterns can be performed on either one or both of the plies. For example, by utilizing the applicating means 38, 39, both patterns are applied to the web or ply 37 whereas if the applying units 42, 43 are employed, the patterns are both applied to the ply 41. Still further, one each of the applying units 38, 39 can be employed for applying adhesive to the web 37 and one of the units 42, 43 can be employed for applying the other pattern to the web 41. The method further comprehends the advantage of curing, if desired, the adhesive applied and for this purpose I provide curing stations as at 40 relative to the web 37 and 51 relative to the web 41.

The method also includes providing cutting means to transversely sever the ply 37 by means of the coaction of the cutting means 46 equipped with blade 47 and the applicator drum 45.

The inventive apparatus is illustrated in FIG. 11. FIG. 11 is essentially schematic but does utilize a frame F as can be appreciated from the fragment illustrated at the upper left where the frame supports a journal or bearing for the unwinding of the roll of material 36. In similar fashion, the frame can provide parts (not shown) for supporting the other operative elements such as the adhesive applying units 38, 39, 42, 43, the curing means 40, 51, the applicator roll 45 and cutting means 46, 47. Reference to the extreme left hand portion of FIG. 11 reveals the presence of draw rolls 55 which develop means for advancing the web 41, for example, along a linear path as indicated by the arrow 56. Similar means (not shown) are provided for advancing the web 37 for engagement with the applicator drum 45 and union thereafter of the transversely severed parts 48 with the web 41. The web 37 is advanced at a speed slower than the web 41 so as to generate the spacing 52 as seen in the lower left hand portion of FIG. 11.

While in the foregoing specification a detailed description of the invention has been set down for the purpose of illustration, many variations in the details hereingiven may be made by those skilled in the art without departing from the spirit and scope of the invention.

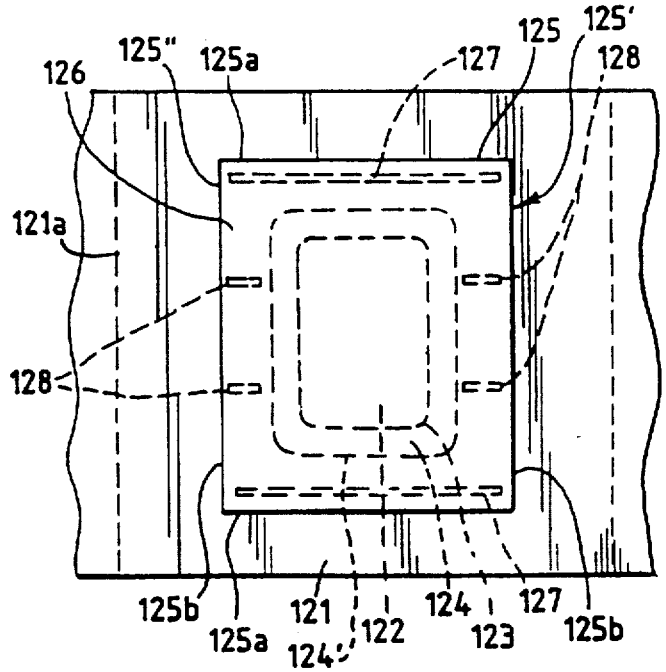

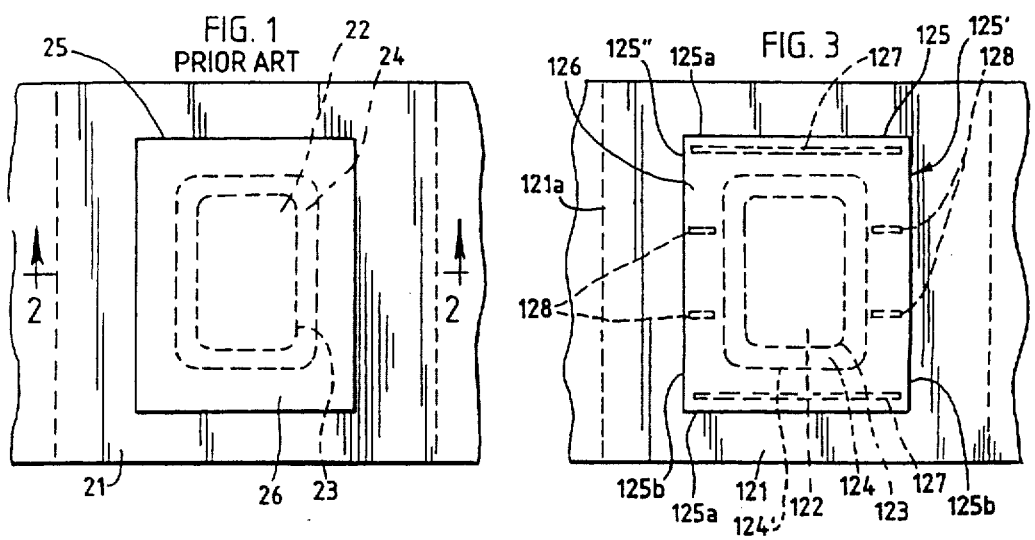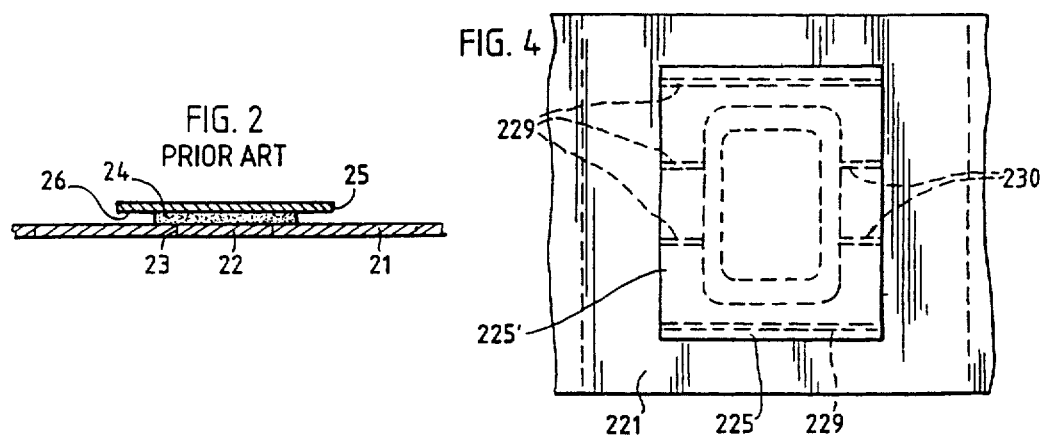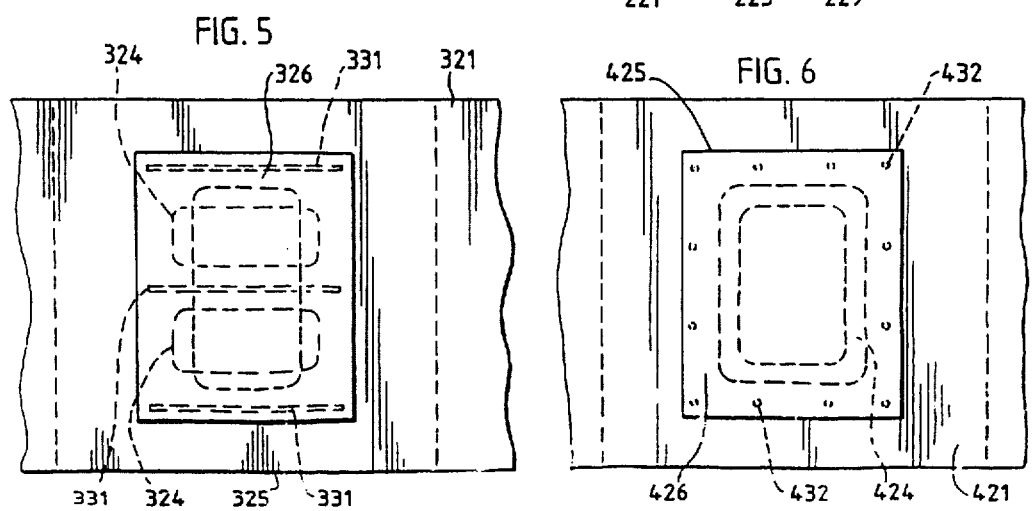

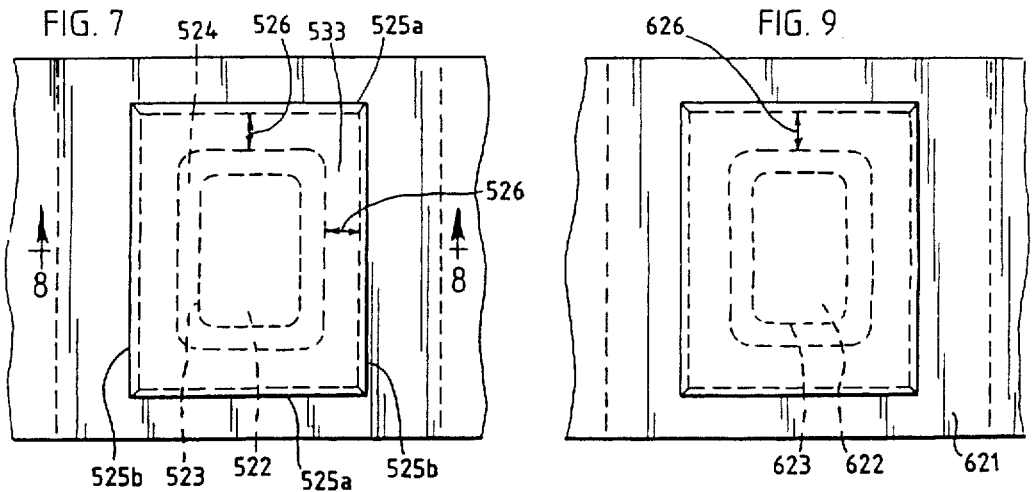
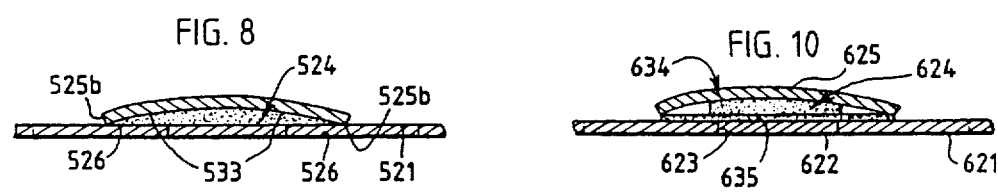
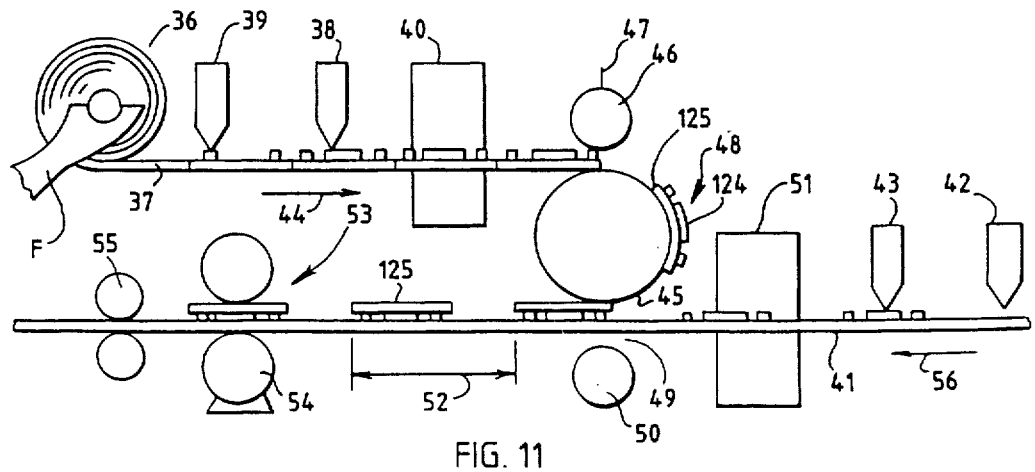

I claim:

1. An integrated label assembly comprising:

a first ply having front and back surfaces, a die cut in said first ply delineating a removable label portion, a primary adhesive pattern on the back surface of said first ply substantially covering said label portion and extending beyond said label portion to define an adhesive pattern perimeter, a release coated backer ply having a perimeter and covering said label portion and said primary adhesive pattern with a portion of said backer ply extending beyond said primary adhesive pattern perimeter to provide a margin between said adhesive pattern perimeter and said backer ply perimeter, and a secondary adhesive pattern in said margin adhering said backer ply to said back surface of said first ply, and characterized in that the adhesion of said backer ply to said back surface of said first ply is different in said second adhesive pattern than in said first adhesive pattern.

2. The assembly of claim 1 in which said secondary adhesive pattern comprises discerrable lines.

3. The assembly of claim 1 in which said secondary adhesive pattern comprises dots.

4. The assembly of claim 1 in which said secondary adhesive pattern covers a relatively small area of margin.

5. The assembly of claim 1 in which said secondary adhesive pattern is thinner in thickness than said primary adhesive pattern.

6. The assembly of claim 1 in which said secondary adhesive pattern tapers in thickness with thinner edge positioned adjacent the perimeter of said release coated backer.

7. The assembly of claim 1 in which said secondary adhesive pattern comprises pressure sensitive adhesive.

8. The assembly of claim 1 in which said secondary adhesive pattern comprises hot melt adhesive.

9. The assembly of claim 1 in which said secondary adhesive pattern comprises one of water emulsion or a solvent based adhesive.

10. The assembly of claim 1 in which said secondary adhesive pattern stops short of the perimeter of said backer ply.

11. The assembly of claim 1 in which said secondary adhesive pattern extends to perimeter of said backer ply.

12. The assembly of claim 1 in which said first ply has an edge adapted to be leading during advance of said first ply in processing, said leading edge having adjacent thereto a portion of said backer ply perimeter, said secondary adhesive pattern being in said margin adjacent said backer ply perimeter portion.

13. An integrated label assembly comprising:
   a first ply having front and back surfaces,
   a backer ply also having front and back surfaces, said backer ply release coated front surface being in face-to-face relation with said first ply back surface,
   a die cut in said first ply delineating a removable label portion,
   a primary adhesive pattern between said backer ply front surface and said first ply back surface substantially covering said label portion and extending beyond said label portion,
   said backer ply having an edge spaced from said primary adhesive pattern and providing a margin, and
   a secondary adhesive pattern in said margin adhering said margin of said backer ply to said back surface of said first ply, said secondary adhesive pattern having less adhesion than said primary adhesive pattern.

14. The assembly of claim 13 in which said first ply is paper.

15. The assembly of claim 13 in which said die cut is continuous cut.

16. The assembly of claim 13 in which said die cut is a perforation.

17. The assembly of claim 13 in which said primary adhesive is pressure sensitive.

18. The assembly of claim 13 in which said primary adhesive is hot melt.

19. The assembly of claim 13 in which said primary adhesive is a water emulsion or a solvent based adhesive.

20. The assembly of claim 13 in which said primary pattern of adhesive has an unglued portion of the label to provide the start of peeling at the time the label is removed.

21. The assembly of claim 1 wherein said backer ply is characterized as having a release coating extending to at least a portion of said perimeter thereof.

* * * * *

UNITED STATES PATENT AND TRADEMARK OFFICE
CERTIFICATE OF CORRECTION

PATENT NO.   : 5,700,536                                  Page 1 of 4
DATED        : December 23, 1997
INVENTOR(S)  : Donald J. Steidinger It is certified that error appears in the above-identified patent and that said Letters Patent is hereby corrected as shown below:

The title page, should be deleted to appear as per attached title page.
The sheets of drawings, consisting of figures 1-11 should be deleted to appear as per attached figures 1-11.

Signed and Sealed this

Ninth Day of June, 1998

*Attest:*

BRUCE LEHMAN

*Attesting Officer*     *Commissioner of Patents and Trademarks*

United States Patent [19]

Steidinger

[11] Patent Number: 5,700,536
[45] Date of Patent: Dec. 23, 1997

[54] INTEGRATED LABEL, METHOD AND APPARATUS

[75] Inventor: Donald J. Steidinger, Barrington, Ill.

[73] Assignee: Tamarack Products, Inc., Wauconda, Ill.

[21] Appl. No.: 597,852

[22] Filed: Feb. 7, 1996

[51] Int. Cl.⁶ .................................................. B32B 3/00
[52] U.S. Cl. .................. 428/40.1; 283/81; 428/41.7; 428/41.8; 428/41.9; 428/42.1; 428/42.2; 428/43; 428/194; 428/212; 428/213; 428/214
[58] Field of Search ............................. 428/40.1, 41.7, 428/41.8, 41.9, 42.1, 42.2, 43, 194, 212, 213, 214; 283/81

[56] References Cited

U.S. PATENT DOCUMENTS

| | | | |
|---|---|---|---|
| 4,379,573 | 4/1983 | Lomeli et al. | 428/42 |
| 4,889,234 | 12/1989 | Sorensen | 428/41.9 |
| 5,011,559 | 4/1991 | Felix | 156/257 |
| 5,098,759 | 3/1992 | Felix | 428/42 |
| 5,271,787 | 12/1993 | Hoffman et al. | 156/268 |
| 5,580,640 | 12/1996 | Kraft | 428/195 |

Primary Examiner—Nasser Ahmad
Attorney, Agent, or Firm—Emrich & Dithmar

[57] ABSTRACT

An integrated label product, method and apparatus wherein there is a first ply equipped with a die cut delineating a removable label, a backer ply having a release material on one surface and adhesive between the backer ply one surface and the label-providing ply, the adhesive being provided in primary pattern and a secondary pattern in different positions with the secondary pattern having substantially less adhesion than the primary pattern.

21 Claims, 4 Drawing Sheets